US010375902B2

(12) United States Patent
Tschopp et al.

(10) Patent No.: US 10,375,902 B2
(45) Date of Patent: Aug. 13, 2019

(54) BATTERY-POWERED BLOWER

(71) Applicant: Black & Decker, Inc., Newark, DE (US)

(72) Inventors: Tylan A. Tschopp, Baltimore, MD (US); Brian Poole, Towson, MD (US); Joshua M. Sheffer, Dover, PA (US)

(73) Assignee: Black & Decker, Inc., Newark, DE (US)

( * ) Notice: Subject to any disclaimer, the term of this patent is extended or adjusted under 35 U.S.C. 154(b) by 100 days.

(21) Appl. No.: 15/611,442

(22) Filed: Jun. 1, 2017

(65) Prior Publication Data
US 2017/0265401 A1    Sep. 21, 2017

Related U.S. Application Data

(62) Division of application No. 14/668,413, filed on Mar. 25, 2015, now Pat. No. 9,668,427.

(51) Int. Cl.
*H01M 2/10* (2006.01)
*A01G 20/43* (2018.01)
*A01G 20/47* (2018.01)

(52) U.S. Cl.
CPC .............. *A01G 20/43* (2018.02); *A01G 20/47* (2018.02); *H01M 2/1022* (2013.01)

(58) Field of Classification Search
CPC ........ A01G 20/43; A01G 20/47; A01G 1/125; H01M 2/10; H01M 10/488; H01M 10/48;
(Continued)

(56) References Cited

U.S. PATENT DOCUMENTS 3,757,194 A    9/1973   Weber et al.
4,517,939 A *  5/1985   Kiyooka ............... F01P 5/06
                                                 123/198 E
(Continued)

FOREIGN PATENT DOCUMENTS

JP      2014148951 A  *  8/2014    ............. F04D 25/08
WO    WO 2014/119175 A1    8/2014
WO    WO 2014/119181 A1    8/2014

OTHER PUBLICATIONS

"European Search Report dated Dec. 12, 2016 for", Application No. 16161714.7-1655.

*Primary Examiner* — Dung Van Nguyen
(74) *Attorney, Agent, or Firm* — John Yun

(57) ABSTRACT

The battery-powered blower includes a housing assembly including a first housing portion having a first inner surface, a second housing portion having a second inner surface, and connected to the first housing portion, and a third housing portion connected to the second portion. The third housing portion has a side outer surface configured to receive a battery. The battery is mountable to the side outer surface of the third housing portion. The second housing portion in connection with to the first housing portion forms an inner chamber therebetween. A fan is provided in the inner chamber to facilitate airflow through the housing assembly and out an outlet, and a motor is provided intermediate to the second housing portion and the third housing portion. The center of gravity with respect to the overall blower is provided proximate to a handle portion.

17 Claims, 15 Drawing Sheets

(58) Field of Classification Search
CPC ........ H01M 2/1027; A47L 9/322; A47L 5/14; A47L 5/24; B08B 5/02; E01H 1/0809
See application file for complete search history.

(56) References Cited

U.S. PATENT DOCUMENTS

| | | | |
|---|---|---|---|
| 4,555,849 A | 12/1985 | Ando et al. | |
| 4,792,286 A | 12/1988 | Gassen | |
| 5,457,846 A | 10/1995 | Kuwano et al. | |
| 5,806,133 A * | 9/1998 | Iida | A47L 5/24 15/405 |
| D418,836 S | 1/2000 | Matt et al. | |
| D481,601 S | 11/2003 | Ashfield | |
| D487,059 S | 2/2004 | Glasgow et al. | |
| 6,982,541 B2 | 1/2006 | Zick et al. | |
| 7,332,889 B2 | 2/2008 | Glasgow et al. | |
| 7,471,064 B2 | 12/2008 | Sobue et al. | |
| 7,476,091 B2 * | 1/2009 | Saitou | A47L 5/14 417/423.1 |
| 7,609,027 B2 | 10/2009 | Zick et al. | |
| 7,741,809 B2 | 6/2010 | Zick et al. | |
| 7,837,434 B2 * | 11/2010 | Rabis | F04D 25/02 415/119 |
| 7,868,590 B2 | 1/2011 | Zick et al. | |
| 7,922,443 B2 * | 4/2011 | Yuasa | F04D 29/703 415/121.2 |
| 8,203,307 B2 | 6/2012 | Zick et al. | |
| 8,286,359 B2 | 10/2012 | Ashfield | |
| 8,745,815 B2 | 6/2014 | Takano | |
| 8,984,711 B2 | 3/2015 | Ota et al. | |
| 2005/0083639 A1 | 4/2005 | Zick et al. | |
| 2005/0123393 A1 * | 6/2005 | Saitou | A47L 5/14 415/119 |
| 2005/0133354 A1 * | 6/2005 | Watanabe | A47L 5/14 200/334 |
| 2006/0179602 A1 * | 8/2006 | Schliemann | A47L 5/14 15/330 |
| 2009/0271945 A1 | 11/2009 | Ludwigson | |
| 2010/0218386 A1 | 9/2010 | Robkamp et al. | |
| 2010/0218967 A1 | 9/2010 | Robkamp et al. | |
| 2010/0266397 A1 | 10/2010 | Allen et al. | |
| 2011/0113587 A1 | 5/2011 | Nagasaka et al. | |
| 2012/0073080 A1 * | 3/2012 | Yokoyama | A01G 20/47 15/405 |
| 2012/0216367 A1 * | 8/2012 | Takano | A01G 20/47 15/344 |
| 2014/0082882 A1 | 3/2014 | Kawamata et al. | |
| 2014/0140861 A1 | 5/2014 | Pellenc | |

* cited by examiner

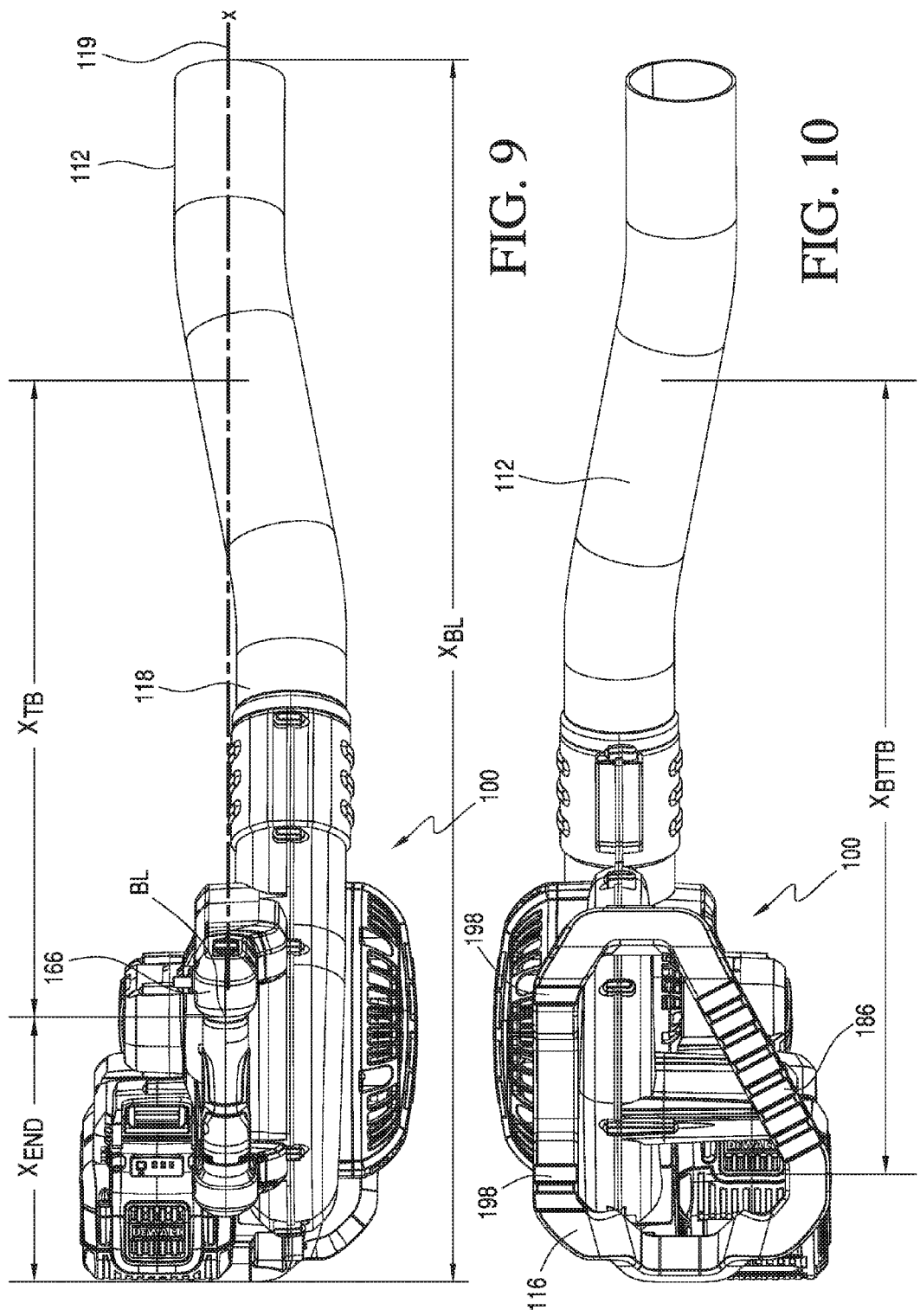

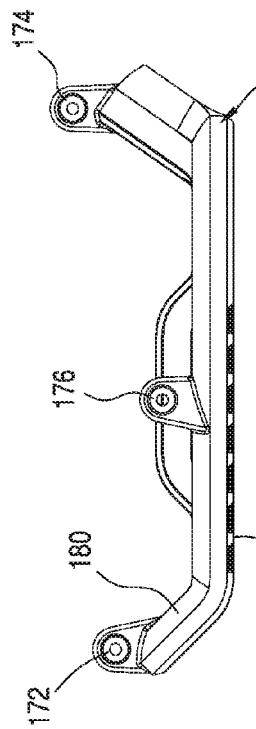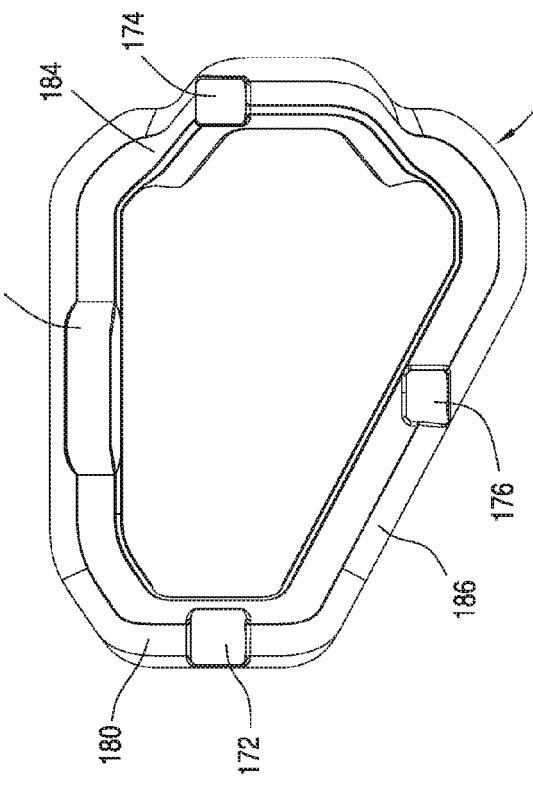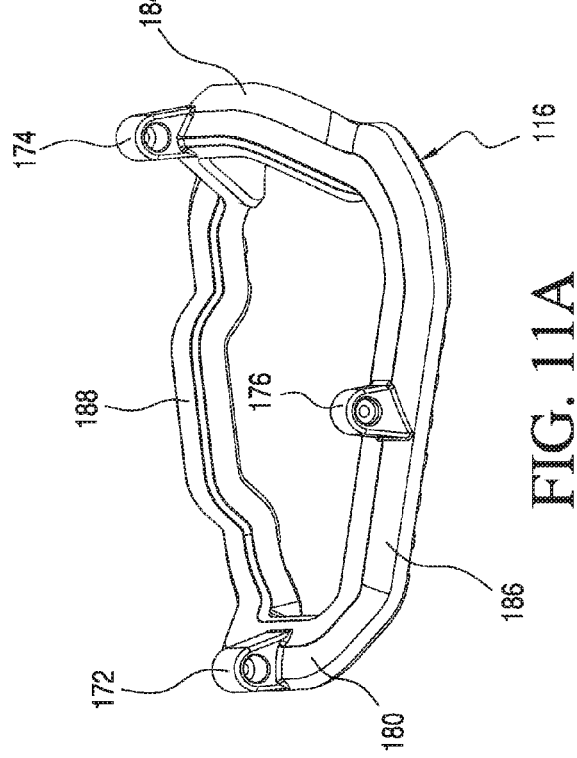

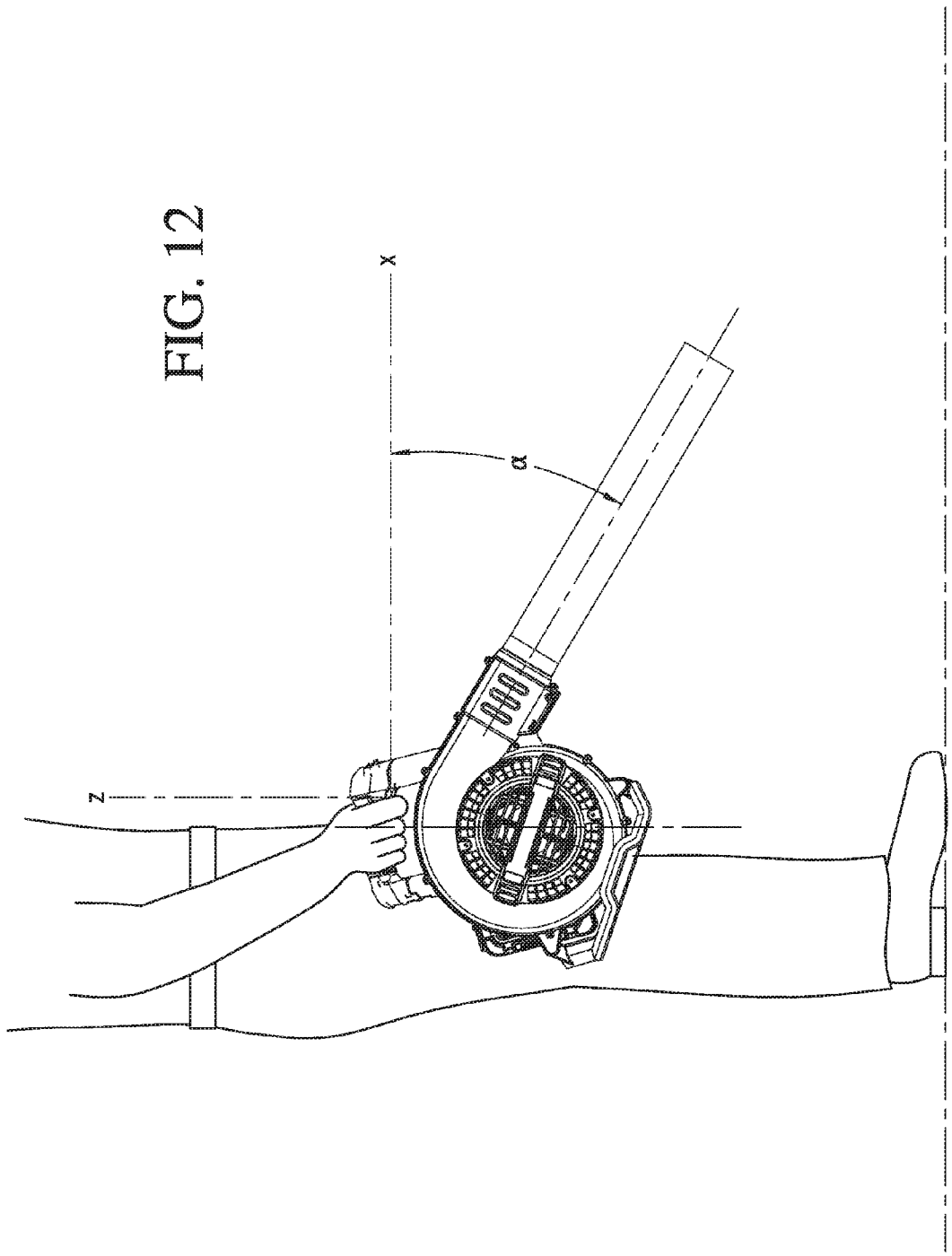

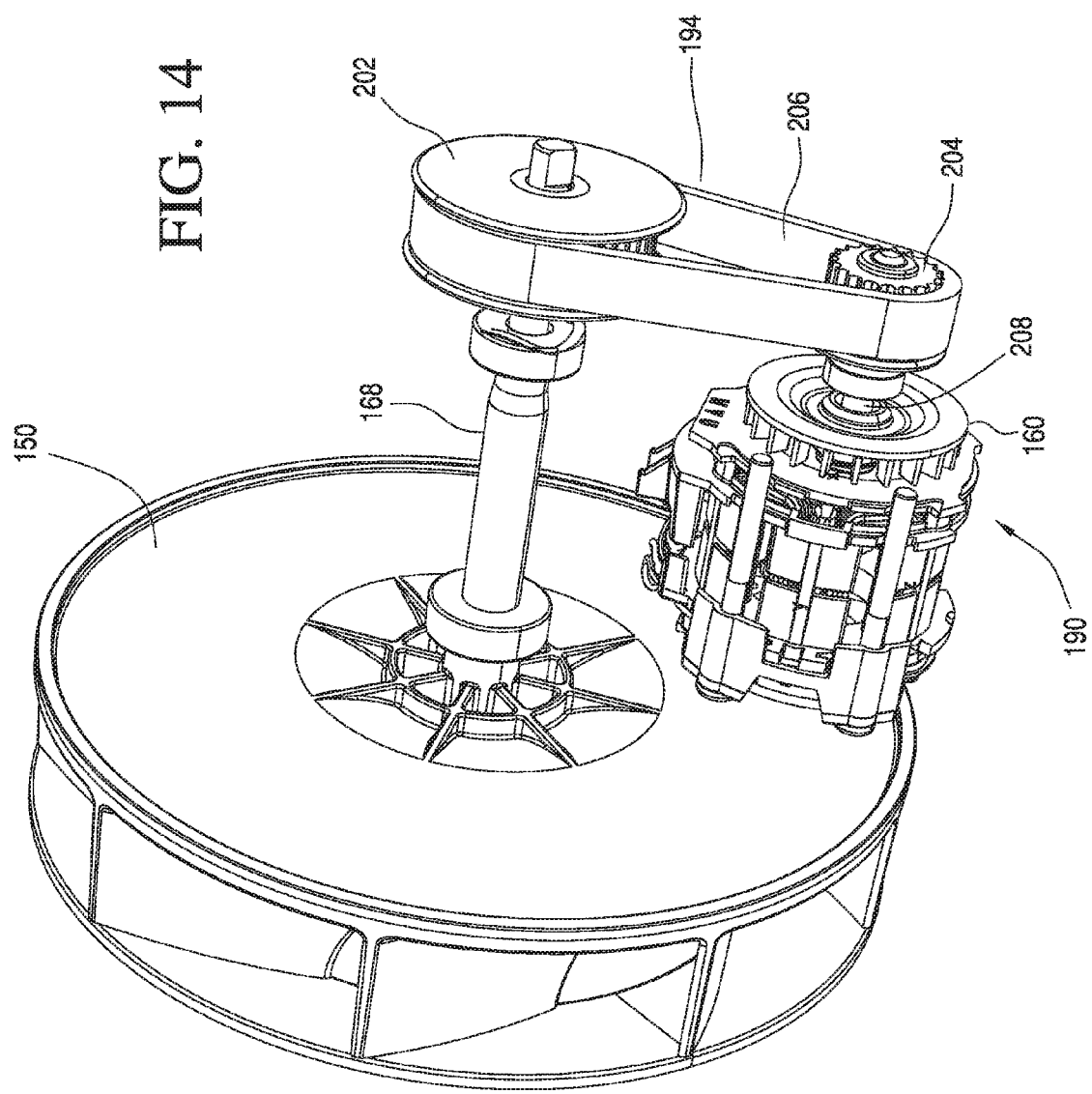

BATTERY-POWERED BLOWER

CROSS REFERENCE TO RELATED APPLICATIONS

This application is a divisional application of U.S. patent application Ser. No. 14/668,413 filed Mar. 25, 2015, which is hereby incorporated by reference for all purposes as if fully set forth herein.

TECHNICAL FIELD

The invention relates to a blower. More particularly, the invention relates to a battery-powered blower having a compact housing configuration that facilitates ease of user operation.

BACKGROUND OF THE INVENTION

Hand-held blowers are generally used for cleaning and/or removing light objects from surfaces, such as blowing away fallen leaves, and/or blowing away light debris, for example. Conventional hand-held blowers include an air outlet or tube, which extend in a generally outward direction from a frontal portion of the blower. During operation, the user selectively points the tube of the blower in the direction of the object(s) and presses a trigger. The trigger is connected to a switch, which activates a fan within the blower. Accordingly, the fan generates a relatively powerful force of air, which is exerted from the tube. By pointing the tube at the objects, the user is able to move the objects towards a selected location using the force of air.

In general, most mobile blowers are either gas-powered or battery-powered and have a self-contained power source, allowing the blower to be transported without the restriction of a cord. Most gas-powered blowers include an internal combustion engine, a blower section driven by the engine, and a handle coupled to the body. One disadvantage of gas-powered blowers during operation is that they may release undesirable emissions into the environment, which is not environmentally favorable. In addition, gas-powered blowers require that the user maintain a constant supply of fuel for the engine. This requires repetitive refilling of the blower that may result in further negative environmental impact as a result of storage and/or spillage.

Most battery-powered blowers use a high powered battery to provide power the blower. Such batteries may be between 18V to 80V, and may have between twenty to fortycells. One common problem with generally high powered batteries are that the batteries are relatively heavy in comparison to the overall weight of the blower. Also, the batteries are typically positioned at the rear of the blower and at a position, front to back that is vertically under the handle, which requires the user to exert high torque forces to turn the blower and overcome the forces created by its location.

To optimize the user's experience, and reduce user fatigue during operation, it is important to balance the component masses within the blower. It is further important to reduce the torque forces required by the user to operate the blower during operation. The two heaviest components of the battery-powered blower are generally the battery and the motor. In most existing blowers, the battery is positioned at a rearward end of the blower.

One disadvantage of positioning the battery near the rear of blower is that the distance from the handle (the suspension point) to the rear of the blower can be rather long. As such, the torque forces required to rotate the blower left to right, or vice-versa, during operation, are relatively high, requiring the user to exert an high amount of energy to operate the blower. Accordingly, blowers having such a configuration may be rather difficult for a user to operate over an extended period of time.

SUMMARY OF THE INVENTION

In light of the present need for a battery-powered blower with a compact configuration, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

The battery-powered blower includes a housing assembly including a first housing portion having a first inner surface, a second housing portion having a second inner surface, and connected to the first housing portion, and a third housing portion connected to the second portion, the third housing portion having a side outer surface configured to receive a battery. The battery powered blower further includes a battery mountable to the side outer surface of the third housing portion. The second housing portion in connection with the first housing portion forms an inner chamber therebetween. A fan is provided in the inner chamber to facilitate airflow through the housing assembly and out an outlet, and a motor is provided intermediate to the second housing portion and the third housing portion The battery-powered blower has a handle portion formed by connecting the second housing portion and the third housing portion. The second housing portion includes a first part of the handle portion and the third housing portion includes a second part of the handle portion. The battery is secured to the side of the third housing portion with a battery mount. Additionally, the motor is positioned laterally below the handle portion. An aperture is formed on the side of the first housing portion to facilitate air flow into the inner chamber.

The battery-powered blower includes a foot that is removably attached to a lower portion of the housing assembly. The foot has a first bracket connection to the first housing portion and a second bracket connection to the second housing portion. The foot also provides an extension to protect the battery. The battery-powered blower further includes a trigger operatively connected to the handle portion. As such, the rear end of the housing assembly is longitudinally less than 8 inches from the trigger. The battery powered blower further includes an inlet cover positioned on the outer surface of the first housing portion.

In further various embodiments, the battery-powered blower includes a housing assembly with a handle portion, a battery mountable to a side portion of the housing assembly, a motor provided within the housing assembly and where a center of gravity of the blower is located below the handle portion.

In further various embodiments, the longitudinal distance from the center of gravity of the battery is less than 10 mm from the longitudinal center of gravity of the blower.

In further various embodiments, the longitudinal distance between the center of gravity of the motor and the center gravity of the battery-powered blower is less than 10 millimeters and the longitudinal distance between the center of gravity of the motor and the center gravity of the battery is less than 127.00 millimeters. Additionally, the battery covers more than 30 percent of the surface area of the outside of the third housing portion of the blower.

In further various embodiments, the battery-powered blower includes, a housing assembly including a handle, a battery mountable to the side outer side surface of the housing assembly, a motor provided inside of the housing assembly; and the battery and motor are positioned vertically beneath the handle.

BRIEF DESCRIPTION OF THE DRAWINGS

In order to better understand various exemplary embodiments, reference is made to the accompanying drawings, wherein:

FIG. 9 is an elevational view of the battery-powered blower of FIG. 1, illustrating the tube alignment with the handle portion and the distance between the handle portion and the end of the battery-powered blower;

FIG. 10 is a bottom view of the battery-powered blower of FIG. 1, further illustrating a foot member connection to the housing assembly;

FIG. 11A is a perspective view of a foot member configured to provide a support for the battery-powered blower of FIG. 1 to be mounted in a resting position;

FIG. 11B is a side view of the foot member of FIG. 11A;

FIG. 11C is an elevational view of the foot member of FIG. 11A;

FIG. 12 is an environmental perspective view illustrating the battery-powered blower operated by a user at an optimal angular suspension point;

FIG. 14 is a perspective view of a motor of the motor assembly, and the fan, operatively connected by a pulley system.

To facilitate understanding, identical reference numerals have been used to designate elements having substantially the same or similar structure and/or substantially the same or similar function.

DETAILED DESCRIPTION OF THE DRAWINGS

For simplicity and illustrative purposes, the principles are shown by way of examples of systems and methods described. In the following description, numerous specific details are set forth in order to provide a thorough understanding of the examples. It will be apparent however, to one of ordinary skill in the art, that the examples may be practiced without limitation to these specific details. In other instances, well known methods and structures are not described in detail so as not to unnecessarily obscure understanding of the examples.

The blower suspension point is the location that the user engages the blower during operation. The moment of inertia is the mass property of a rigid body that determines the torque needed for a desired angular acceleration about an axis of rotation. The moment of inertia depends generally on the shape of the body, and may vary at different axes of rotation. It is generally preferable for a handheld device to have a low moment of inertia, which is a good indicator of ease rotation and thus operation.

In general, the moment of inertia of the handheld blower may be reduced by positioning the heaviest components, such as the battery and motor, proximate to the suspension point of the handheld device. In doing so, the moment of inertia of the hand-held device will likely be reduced, and thus, the torque required to operate (i.e. rotate the hand-held device) will likely be reduced as well.

The battery-powered blower described herein is a radial blower (but the principals described herein are not limited to any specific type of blower), which provides a housing assembly with a relatively compact configuration. The compact configuration of the battery-powered blower positions the motor and battery relatively proximate to each other, as well as proximate to the suspension point in the handle. By reducing the distance between the motor and the battery, as well as the respective distance between the handle, the battery and the motor, torque forces required to rotate the blower and thus the moment of inertia during operation is significantly reduced. Another mechanical advantage of a relatively compact configuration is that the overall longitudinal length of the battery-powered blower is reduced. Thus, the distance from the handle to the rear of the blower allows a user to operate the blower closer to their body, providing the user with enhanced control, thus providing further efficiencies in use.

Figure 1:
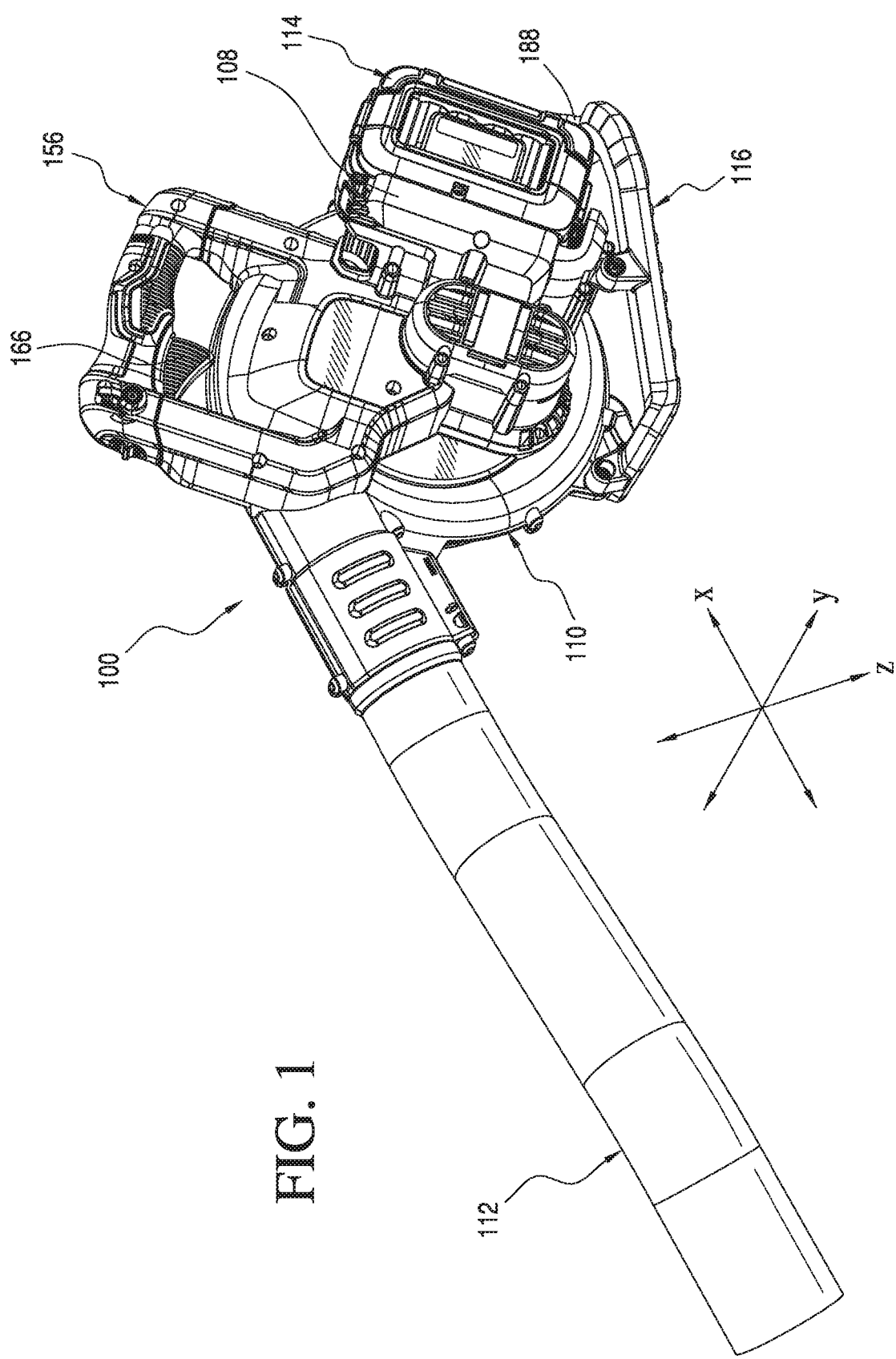
FIG. 1 is a perspective view of a battery-powered blower having a compact body configuration, illustrating a battery unit installed thereon.

Referring now to the drawings, wherein the illustrations are for purposes of describing one or more embodiments and not for the purposes of limiting the same, FIG. 1 illustrates an embodiment of the battery-powered blower, generally designated by the reference numeral 100. The battery-powered blower 100 generally includes a housing assembly 110, a tube 112 connected to the housing assembly 110, and an energy component, such as a rechargeable battery 114, removably mounted to the housing assembly 110. The battery 114 is mounted to a side of the housing assembly 110 so that a majority of the battery is located within the outer perimeter of the housing assembly 110, as viewed from the side (see FIG. 2B). As shown, the tube 112 is connected to the housing assembly 110 to control the direction of air exiting the housing assembly 110.

The battery-powered blower 100 further includes, a foot member 116 removably connectable to a lower portion of the housing assembly 110. The foot member 116 provides a base, allowing the battery-powered blower 100 to sit on a surface. Additionally, the foot member 116 in cooperation with a battery mount 108 protects the battery 114.

The energy component 114, in the form of a rechargeable battery 114, is removably connected to a side portion of the housing assembly 110. The battery 114 may be a lithium-ion battery type, providing approximately 40-56 volts or more of power to drive the battery-powered blower 100. As such the battery 114 may include 20 cells to 30 cells, or more. Notably, it is further contemplated that other rechargeable battery types and power sources may be used to provide power to the blower 100, without departing from the scope of the invention. Further, batteries that provide other voltages to power the battery-powered blower 100 are also contemplated.

For purposes of discussion with respect to the battery-powered blower 100 and the center of gravity distance measurements, the terms center of gravity and center of mass may be used interchangeably. In general, the center of gravity is defined as the center of mass or the point at which the entire weight of a body may be considered as concentrated so that if supported at this point the body would remain in equilibrium in any position.

For purposes of illustration, FIG. 12 shows a conventional operating position for the battery-powered blower 100. As shown, the user holds the battery-powered blower 100 at its suspension point (which is proximate to the trigger 166 in the handle 156) at an equilibrium angle α, which is generally between the range of −30 to 0 degrees relative to the longitudinal axis (x), which in this case is approximately −25 degrees. In this position, the user points the tube 112 generally towards the object(s), he/she wants to blow at an operating angle of α (−25 degrees), relative to the (x) axis.

Figure 2A:
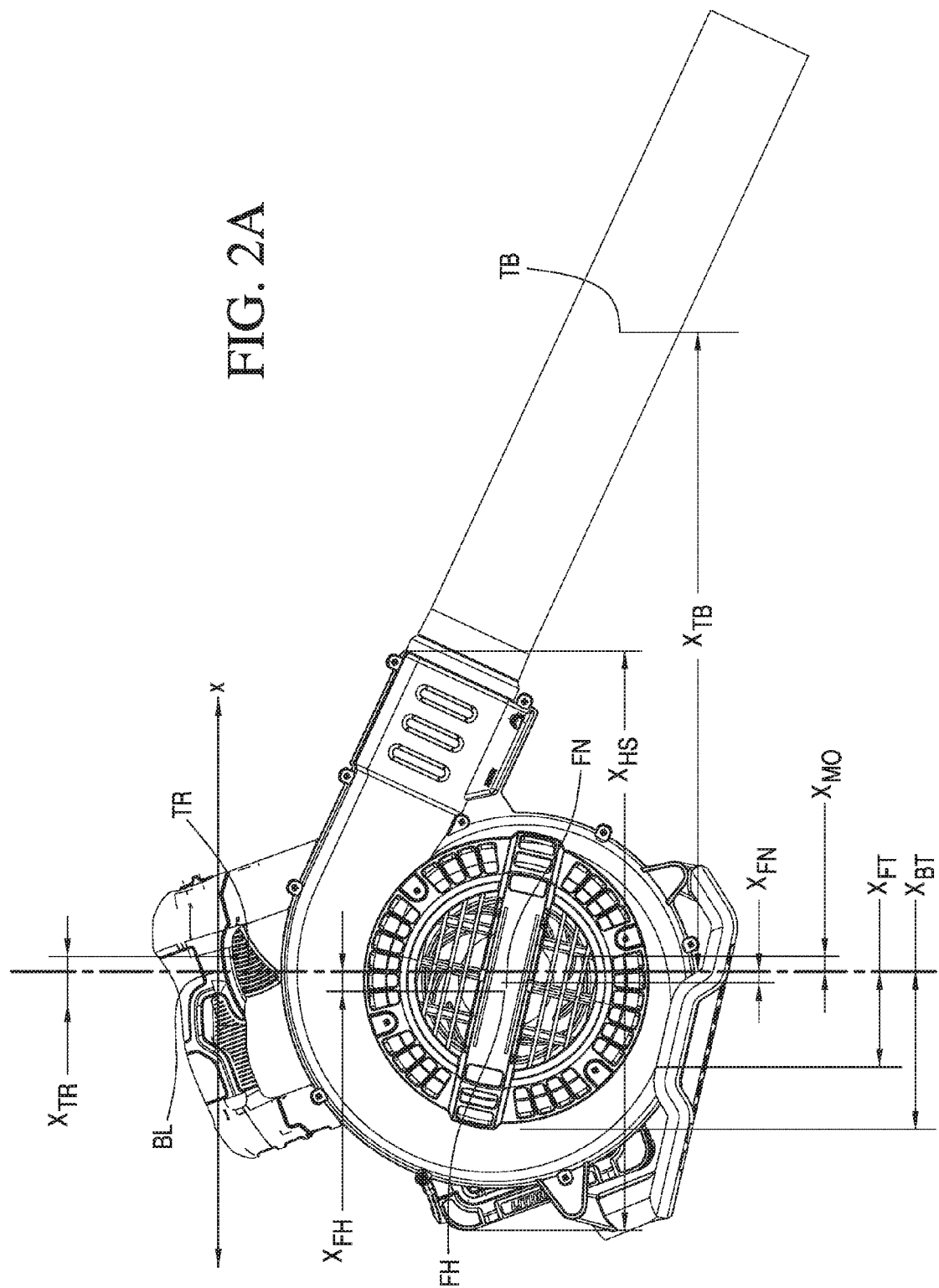
FIG. 2A is a first side view of the volute inlet side of the battery-powered blower of FIG. 1 illustrating the center of gravity of the battery-powered blower and components, about the longitudinal axis (x)
Figure 2B:
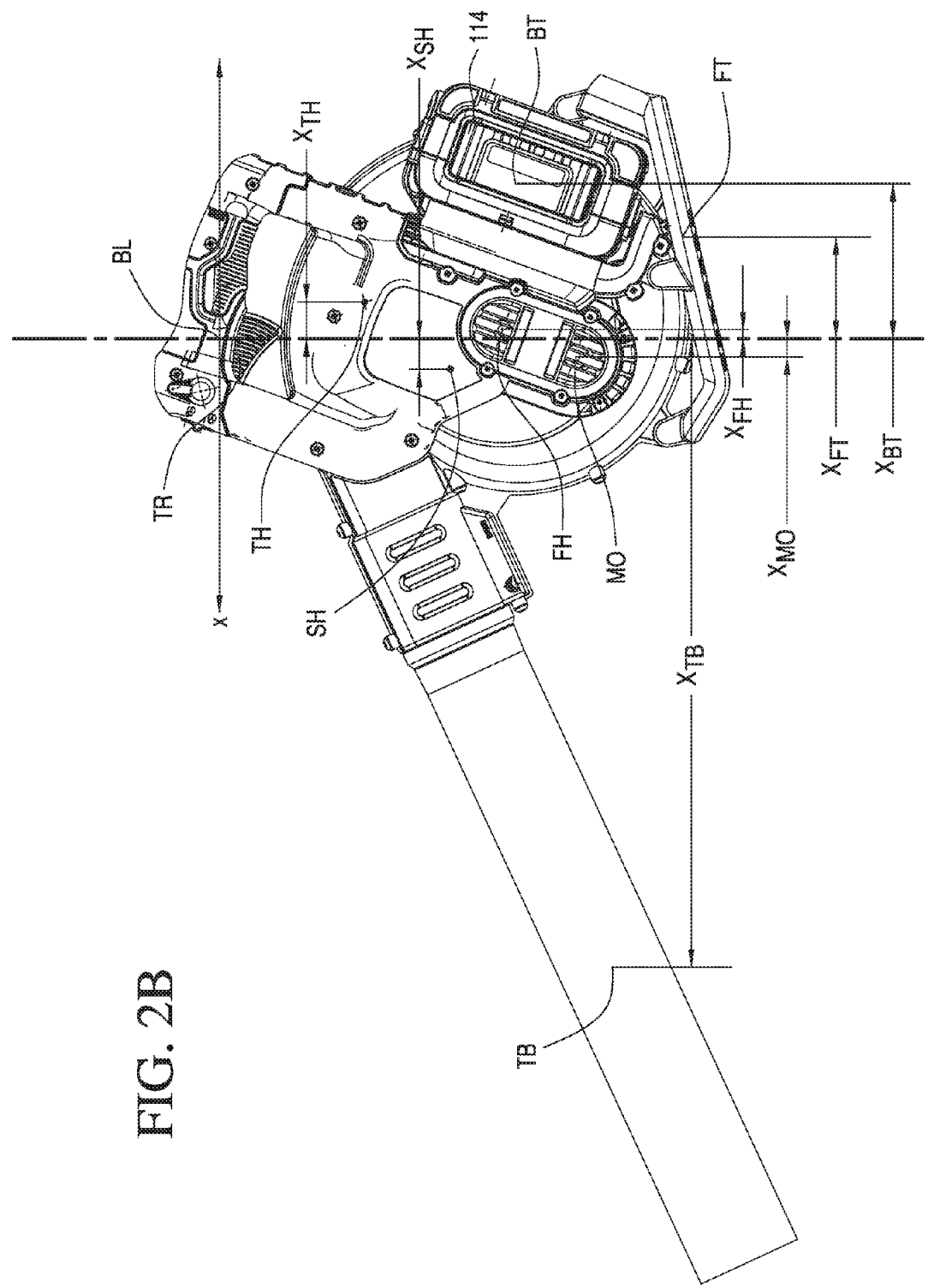
FIG. 2B is a side view of the battery side of the battery-powered blower of FIG. 1, illustrating the center of gravity of the battery-powered blower about the longitudinal axis (x)
Figure 3:
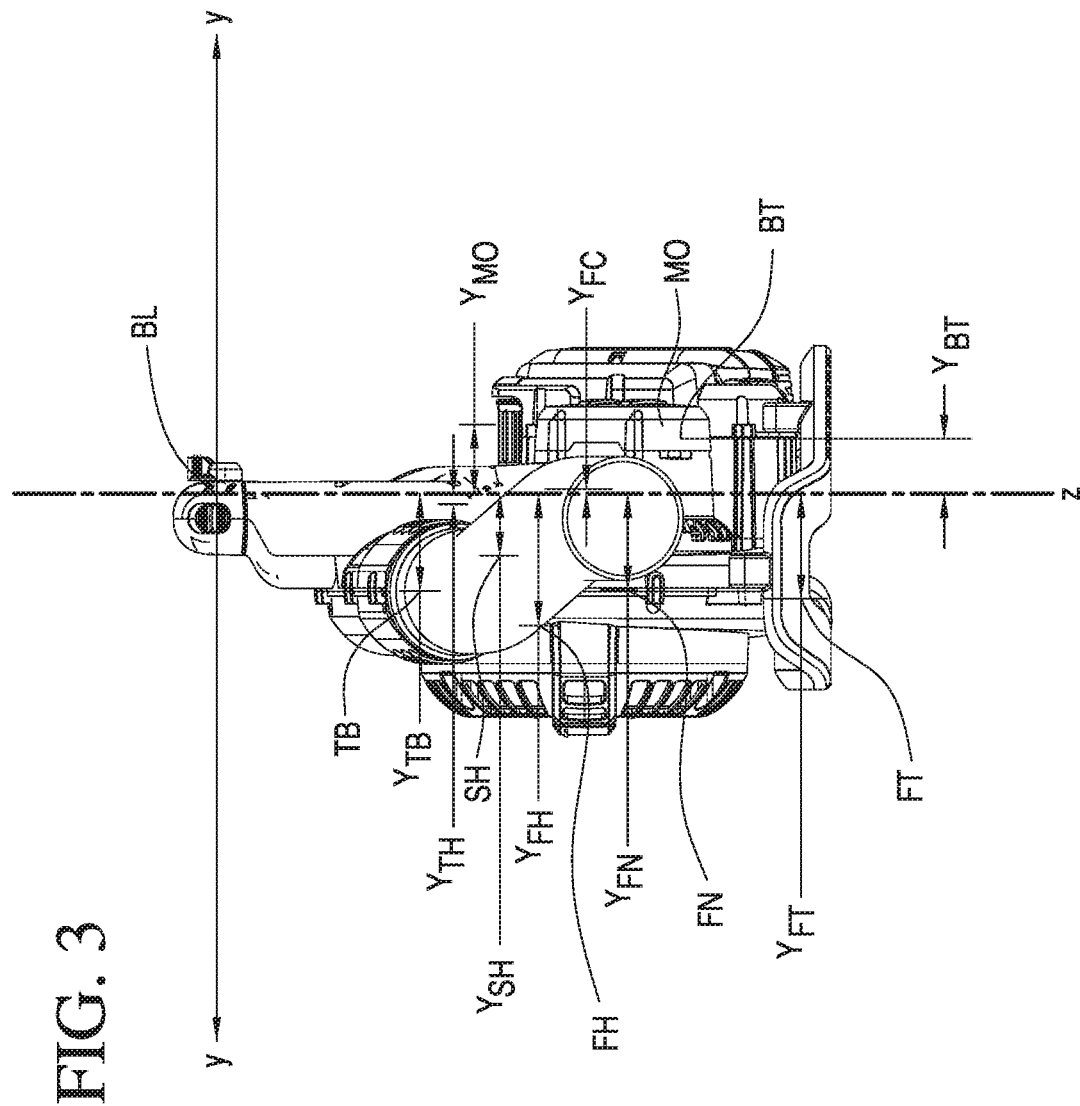
FIG. 3 is a frontal view of the battery-powered blower of FIG. 1, further illustrating the center of gravity of the blower and components about a lateral axis (y)

To determine the overall center of gravity (mass) for the battery-powered blower 100, the center of gravity for each respective component of the battery-powered blower 100 was also calculated. FIGS. 2A, 2B and FIG. 3 illustrate the center of gravity of the separate components of the battery-powered blower 100, and the component's longitudinal and lateral relationship to the overall center of gravity of the battery-powered blower (BL). As shown, a coordinate system is depicted to illustrate the relative positions of the components. In the coordinate system, the (x) axis represents the longitudinal (front to back) center of gravity of the battery-powered blower. The (y) axis is oriented in a lateral direction, and extends to the left and right with respect to the (x) axis, and represents the lateral (side to side) center of gravity of the battery-powered blower. The (z) axis is oriented at a right angle to the (x) axis, in the height direction extending vertically relative to the horizontal arrangement of the (x) axis.

Figure 6A:
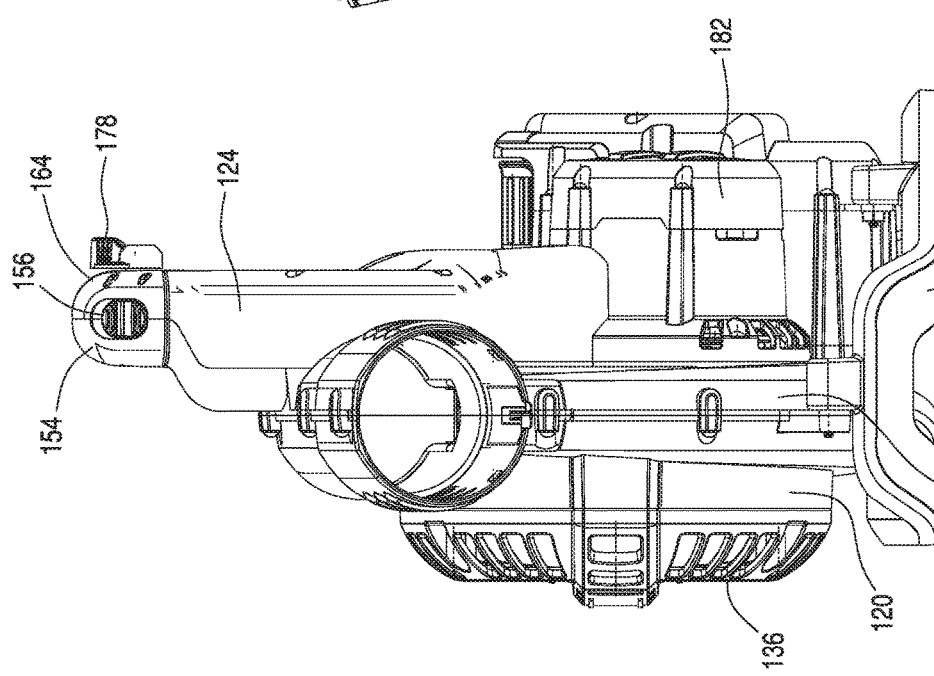
FIG. 6A is a front view of the battery-powered blower of FIG. 1, illustrating a third housing portion in detail.
Figure 6B:
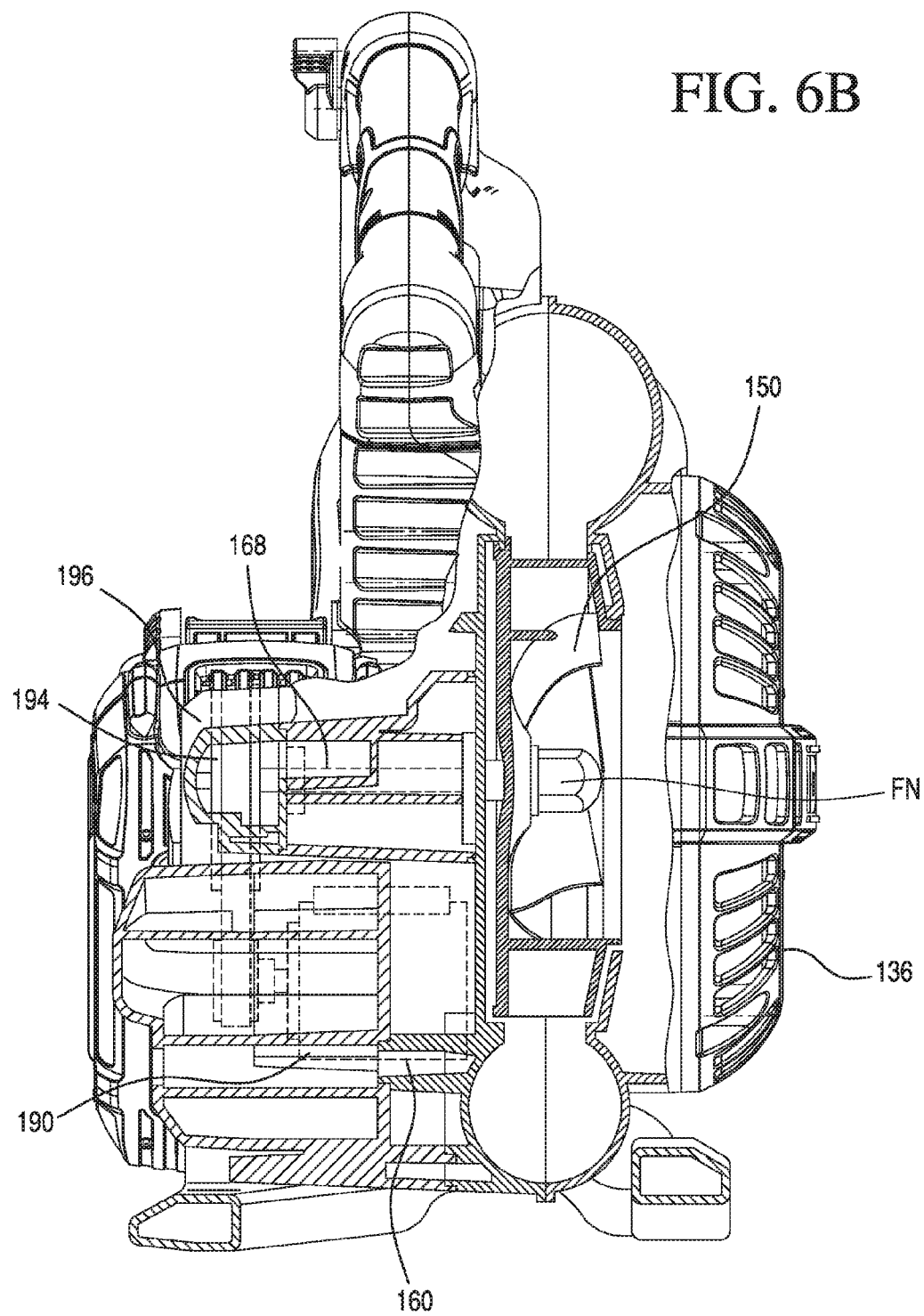
FIG. 6B is rear sectional view of the battery-powered blower of FIG. 1, illustrating a motor assembly operatively connected to a fan.
Figure 6C:
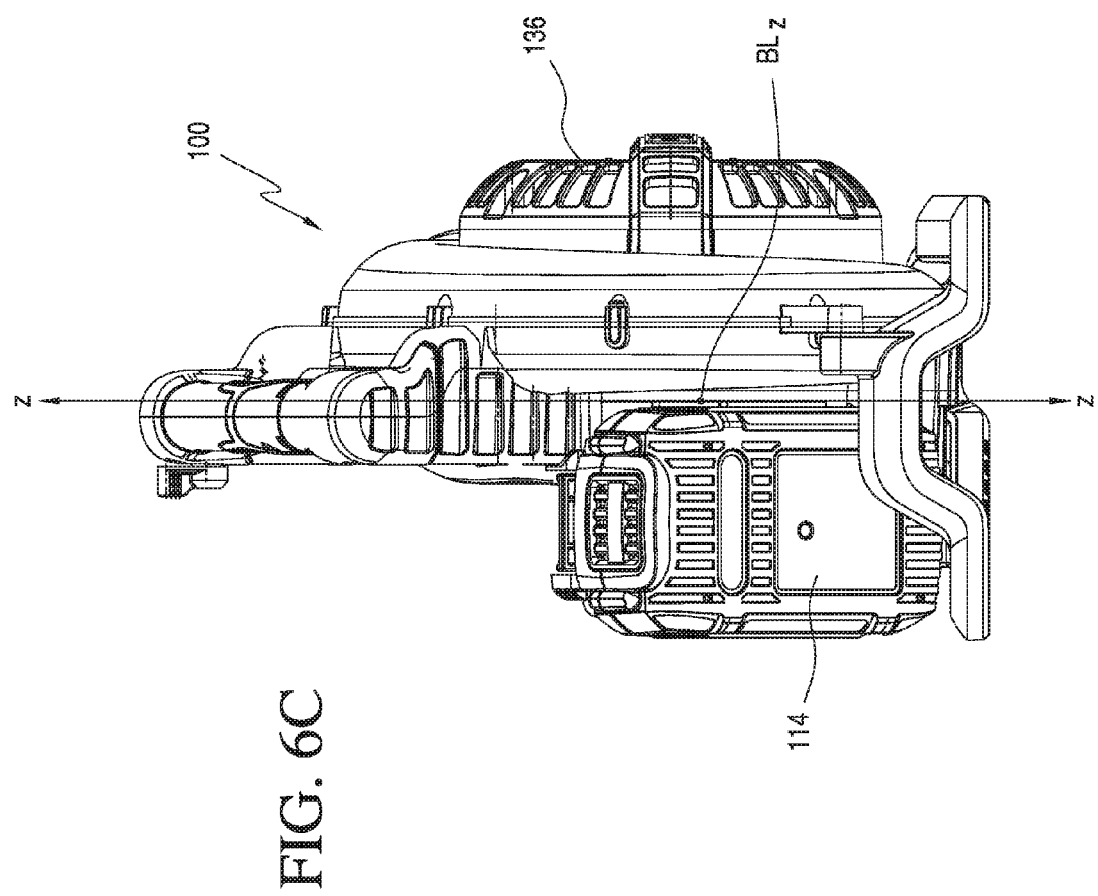
FIG. 6C is a rear view of the battery powered-blower of FIG. 1, illustrating the vertical center of gravity of the blower about a vertical axis (x)

As illustrated, the longitudinal and lateral center of gravity of the overall battery-powered blower BL is achieved proximate to the suspension point of the trigger 166 and the handle portion 156. In this embodiment, the above-described coordinate system is centered at BL. Reference to the center of gravity for each respective components in FIGS. 2A, 2B and 3 will be further described later herein. Notably, as depicted in FIG. 6C, the vertical center of gravity of the battery-powered $BL_z$ is located vertically proximate to the motor 190 and battery 114.

Figure 4:
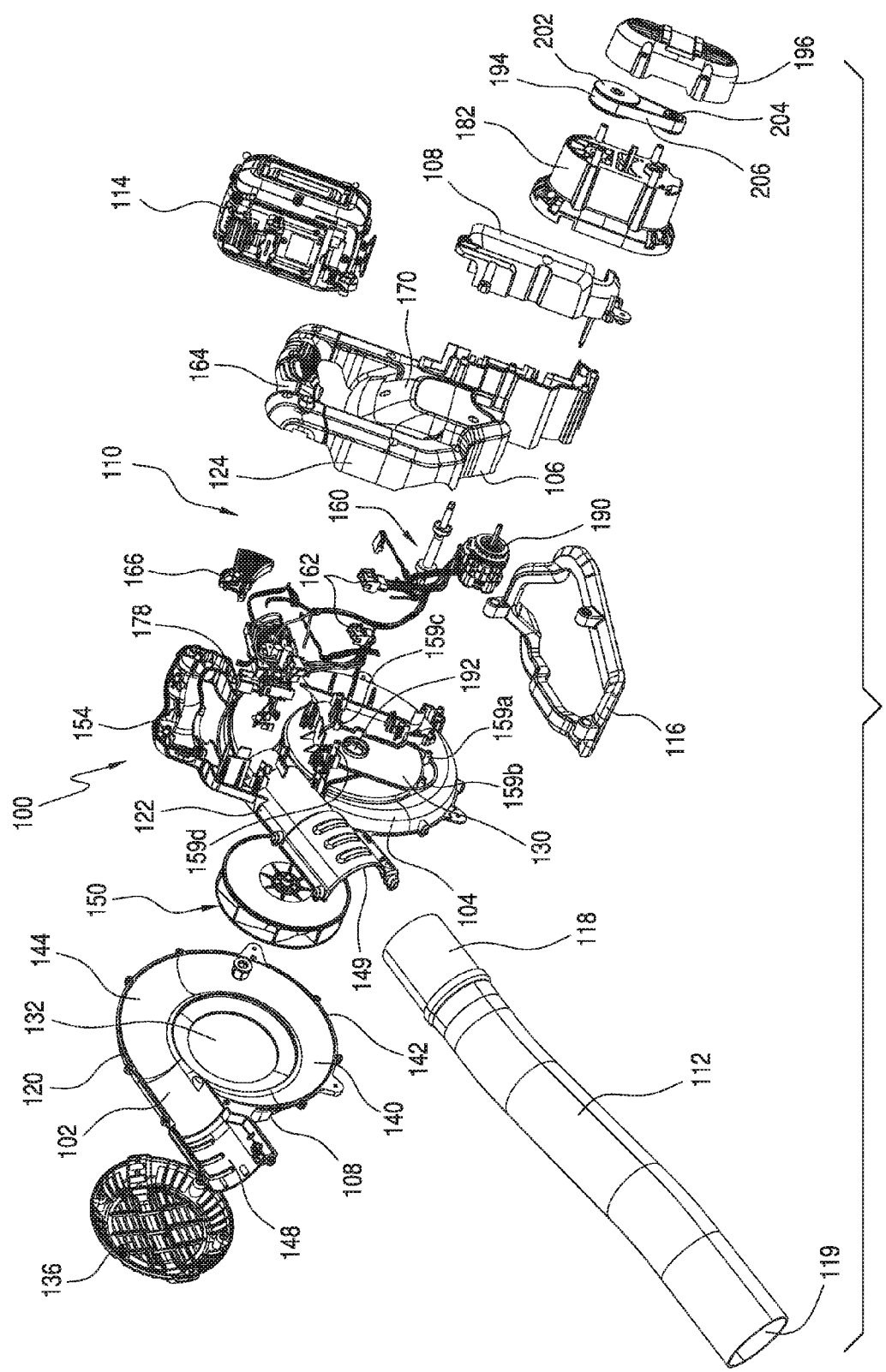
FIG. 4 is an exploded perspective view of the battery-powered blower of FIG. 1 and components.

FIG. 4 represents an exploded view of the battery-powered blower 100. The housing assembly 110 includes a radial fan 150, which is substantially mounted within the housing assembly 110. The fan 150 is configured to rotate radially within the housing assembly 110 to force air out of the tube 112 at outlet 119. As illustrated, the housing assembly 110 includes a first housing portion 120, defining a volute housing inlet side, a second housing portion 122, defining a volute handle side, and a third housing portion 124 providing a handle cover portion.

As shown, the housing assembly 110 is formed with the first housing portion 120 fastened to the second housing portion 122 such that the inner surface 140 of the first housing portion 120 is positioned adjacent to inner surface 104 (not visible in FIG. 4) of the second housing portion 122. Further, the second housing portion 122 is fastened to the third housing portion 124 such that the opposing inner surface 130 of the second housing portion 122 is positioned adjacent to the inner surface 106 (not visible in FIG. 4) of the third housing portion 124. The overall longitudinal length of the housing assembly 110 is approximately 389.3 mm at a −25 degree working angle, as shown in FIG. 2A as XHS.

Figure 5:
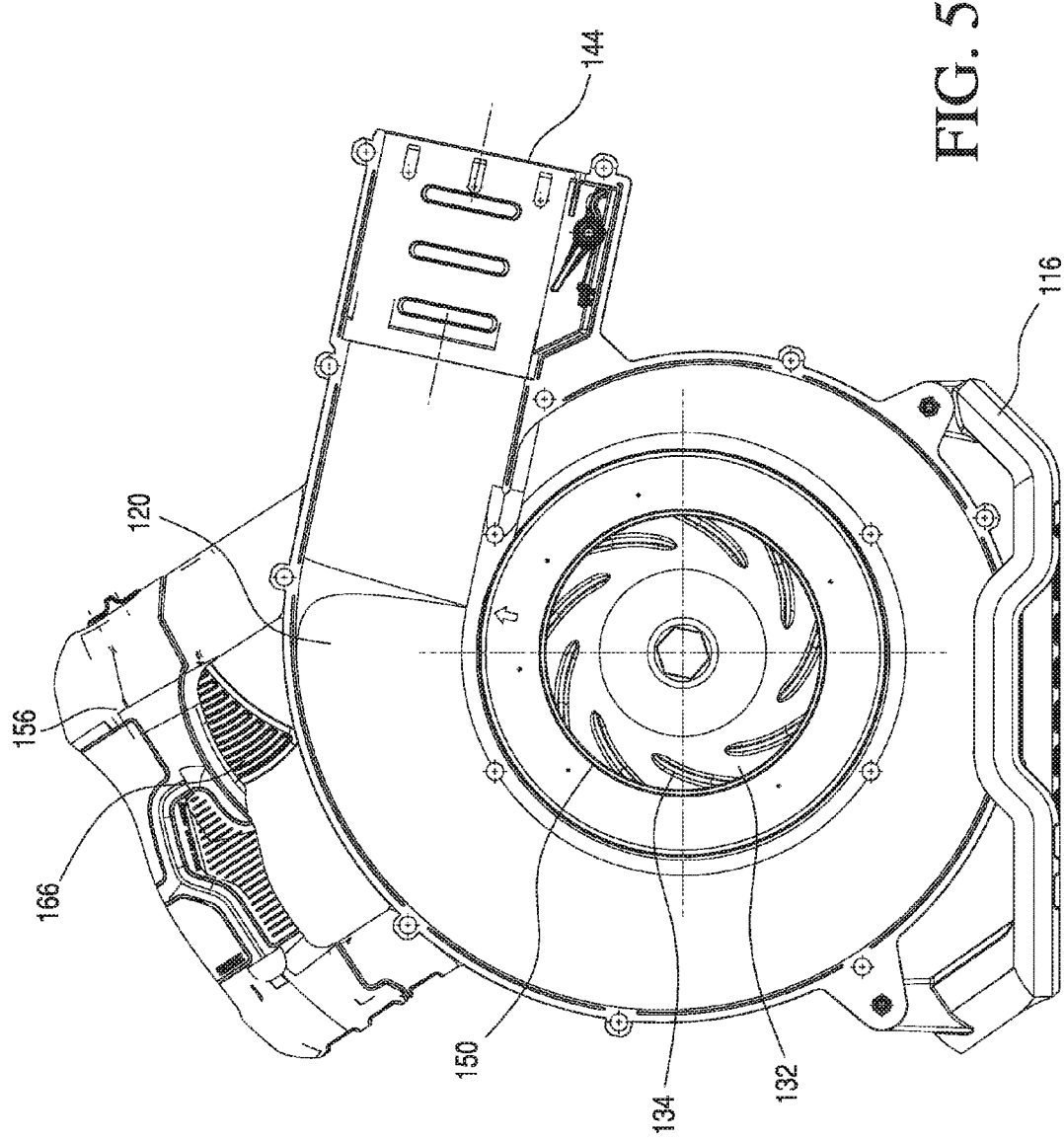
FIG. 5 is a side view of the battery-powered blower of FIG. 1, illustrating a first housing portion in detail.

As further shown in FIGS. 4 and 5, the first housing portion 120 has a centrally disposed aperture 132. The aperture 132 provides an inlet allowing air to flow into the housing assembly 110 when the fan 150 is activated. An inlet cover 136 or grill is removably attachable to the exterior surface 146 of the first housing portion 120. As such the inlet cover 136 has a reticulated configuration, partially covering the aperture 132 to prevent debris from entering the aperture 132, during operation.

The first housing portion 120 has in interior surface 140 formed therein. The interior surface 140 has a volute-shape, providing a first portion of an interior chamber 142 and further defining a portion of an air passageway 144. The first housing portion 120 also has a sleeve 148 configured to receive a proximal end 118 of the tube 112. The first housing portion 120 is comprised of a generally rigid, plastic material, which may be polyurethane, or a similarly durable plastic composite material, such as Xenoy (polycarbonate+polybutylene terephthalate), glass filled nylon, Nylon, ABS, polypropylene, polymers, polymer based composites, for example. FIGS. 2A-B and FIG. 3 illustrate the relationship of the longitudinal and lateral center of gravity of the first housing portion 120 at FH to the entire longitudinal and lateral center of gravity of the battery-powered blower at BL.

Accordingly, the longitudinal distance XFH, from the longitudinal center of gravity of the first housing portion FH, to the longitudinal center of gravity of the Blower BL, is approximately equal to 14.7 mm. The distance of the lateral center of gravity of the first housing portion FH to the lateral center of gravity of the Blower BL, is YFH, which is approximately 81.4 mm.

As illustrated in FIG. 4, the second housing portion 122 is centrally disposed in the housing assembly 110, generally between the first housing portion 120 and the third housing portion 124. Similar to that of the first housing portion 120, the second housing portion 122 may be comprised of a plastic material, such as polyurethane, Xenoy glass filled nylon, Nylon, ABS, polypropylene, polymers, polymer based composites, for example. As shown in FIG. 4, the second housing portion 122 has an interior surface 104, which in cooperation with the first housing portion 120, defines the interior chamber 142 and the passageway 144 The second housing portion 122 also includes a portion of a sleeve 149, which in cooperation with the sleeve portion 148 of the first housing portion 120, cooperatively receives the proximal end 118 of the tube 112.

The interior chamber 142 receives the fan 150 therein. The fan 150 is configured to generate a vacuum, forcing air to flow through aperture 132, into interior chamber 142 and passageway 144, and through the tube 112. As shown, the fan 150 is disposed within the interior chamber 142 and is aligned with the aperture 132. The fan 150 is operatively connected to a motor assembly 160 (via a belt drive system described later), which rotates the fan 150. As shown in FIGS. 2A-B, FIG. 3, and FIG. 6B the center of gravity of the fan 150, is represented at FN, in which XFN is approximately 9.9 mm longitudinally from the longitudinal center of the gravity of the battery-powered blower BL. The distance of the lateral center of gravity of the fan 150 at FN to the lateral center of gravity of the blower BL is YFN, which is approximately 58.3 mm The second housing portion 122 further includes a first part 154 of a handle portion 156. The first part 154 of the handle portion 156 is provided generally at an upper portion of the second housing portion 122, and is configured for connection to a second part 164 of the handle portion 156, which will be described further in detail hereinafter. The third side portion or inner surface 130 of the second housing portion 122 provides a series of mounts 159a-d. As shown, the mounts 159 a-d engage the battery housing 182 to provide mountable support of the motor assembly 160. The supports 161 a-d on the motor housing 182 (as seen in FIG. 8), are configured to receive the respective mounts 159a-d provided on the second housing portion 122, thus securing the motor housing 182 to the second housing portion 122.

As illustrated in FIG. 2B and FIG. 3, the second housing portion 122 has a center of gravity represented as SH, which is approximately 11.9 mm longitudinally from the longitudinal center of gravity of the battery powered blower BL, shown as XSH. Further, the second housing portion 122 has a lateral center of gravity distance of YSH, which is approximately 39.1 mm laterally from the lateral center of gravity of the blower BL.

Figure 8:
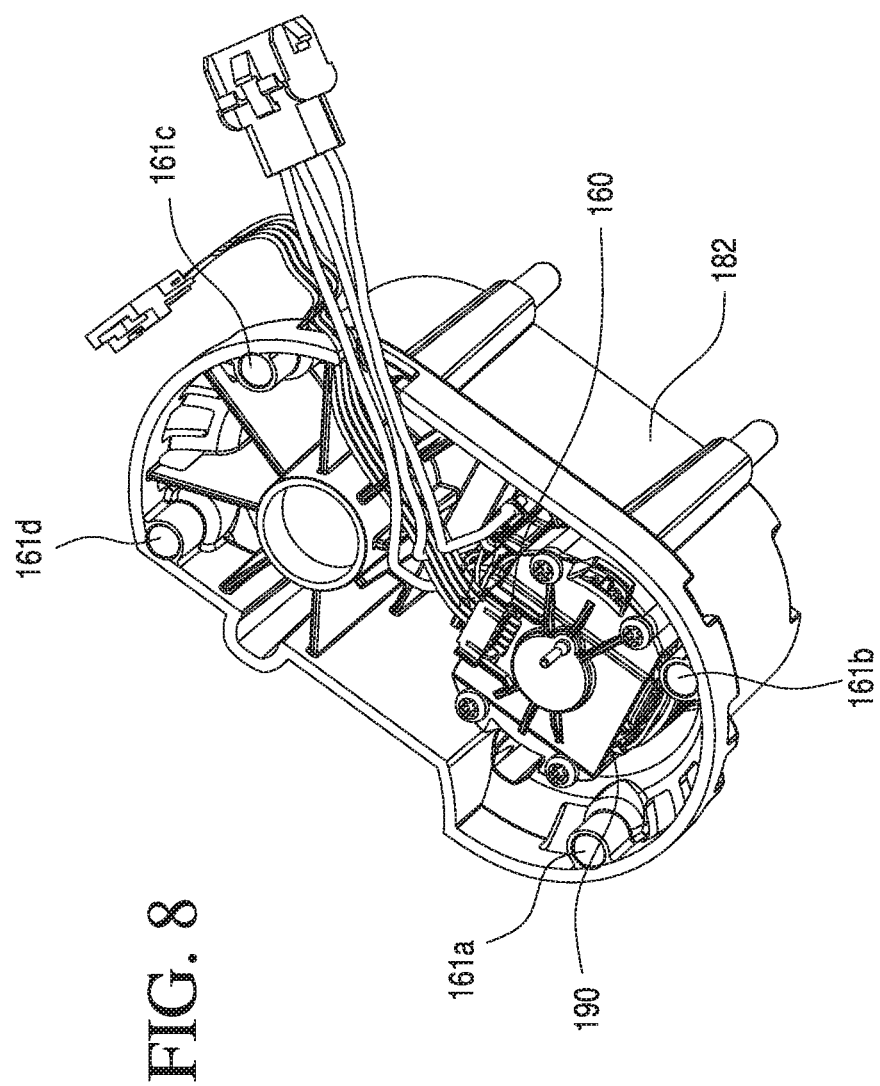
FIG. 8 is a perspective view of a motor assembly positioned in a motor case.

As shown in FIGS. 4 and 8, the motor assembly 160 includes a motor 190 for providing power to the fan 150 by converting electrical energy to mechanical energy. The motor assembly 160 further includes a switch 178 connected to the motor 190 through connectors 162, and a motor field case 182 configured for mounted engagement to the second housing portion 122, to cooperatively enclose the motor 190 with the second housing portion 122. The motor 190 engages the fan 150 through an opening 192 formed in the second housing portion 122 (via a pulley system 194 described later). The motor 190 is also operatively connected to the trigger 166, which is used to activate the motor 190 by the user.

Figure 7:
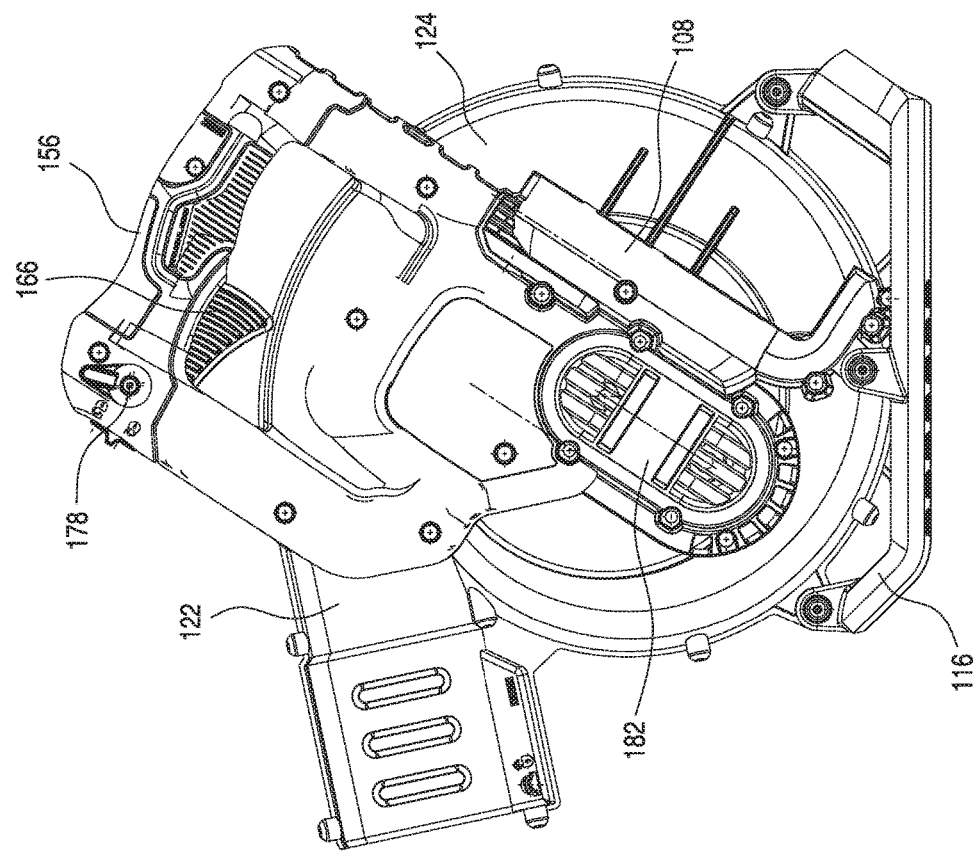
FIG. 7 is a side view of a handle side of the battery-powered blower of FIG. 1.

As shown in FIGS. 7 and 8, the motor 190 is enclosed in the field case 182, between the second housing portion 122, generally below the handle portion 156. The field case 182 is connected to the inner surface 130 of the second housing portion 122, as shown in FIGS. 4 and 7. As such, the motor 190 is positioned generally vertically below the handle portion 156. The motor 190 is coupled to a pulley or belt drive system 194 and is covered by a pulley cover 196.

As shown, the pulley 194 includes a generally circular first gear 202 and a generally circular second gear 204, operatively connected by a belt 206. The pulley system 194 is mounted to the exterior of the motor field case 182 and enclosed therein by the pulley cover 196. The pulley cover 194 is mounted to the motor field case 182. The pulley system 194 allows for increased torque at lower motor speeds and therefore use of a smaller motor to produce equivalent power outputs of larger direct drive systems. Further, advantages of belt drive systems over gear systems are that they are quieter and generally more efficient.

As illustrated in further detail in FIG. 14, the motor 190 is operatively connected to the second gear 204 by a second axle member 208. The fan 150 is operatively connected to the first gear 202 by a first axle member 168. The belt 206 facilitates the transfer of mechanical power, torque and speed across the axles 168 and 208. As such, rotational movement of the second axle 208 by the motor 160 rotates the second gear 204. The belt 206 transfers power to the first gear 202, causing the first axle 168 to rotate the fan 150.

As illustrated in FIGS. 2B and 3, the longitudinal center of gravity of the motor 190 about the longitudinal axis of the blower 100 is represented at MO. The longitudinal distance of the longitudinal center of gravity of motor XMO is approximately 9.4 mm from the longitudinal center of gravity of the blower BL. The lateral axis of the center of gravity of the motor at MO has a lateral distance of YMO to BL, which is approximately 44.0 mm laterally. In this centrally located position, the mass of the motor 190 is located generally below the handle portion 156. As such, the torque forces with respect to the mass of the motor 190 when it comes to turning the blower 100, are reduced in comparison to blowers with motors that are not as centrally located to the longitudinal and lateral center of gravity BL of the blower 100.

The third housing portion 124 of the housing assembly 110 has an inner surface 106 (not shown in FIG. 4), configured for connection with opposing inner surface 130 of the second housing portion 122. The third housing portion 124 has an outside portion 170. The third housing portion 124 has an upper portion which defines a second part 164 of the handle portion 156. As previously described, the second part 164 and first part 154 of the second housing portion 122 define the handle portion 156. The handle portion 156 allows the user to hold the battery-powered blower 100 in front the user at a selected angle, which is generally between 0 and −30 degrees. As illustrated in FIG. 2B, the longitudinal center of gravity of the third housing portion 124, about the longitudinal axis (x) is represented at TH The distance of the longitudinal center of gravity of the third housing portion XTH is approximately 11.9 mm from the longitudinal center of gravity of the blower BL. TH has a lateral distance of YTH from the lateral center of gravity of the blower BL, which is approximately 7.3 mm. As further shown in FIG. 9, the distance of the longitudinal center of gravity of the blower BL to the end of the housing 110 has a longitudinal distance of XEND which is approximately 191 mm at a 25 degree working angle. The ratio of the longitudinal distance between the center of gravity of the battery-powered blower and the end of the of the battery-powered blower and the overall longitudinal length of the battery-powered blower is approximately 0.22

As shown in FIG. 7, the trigger 166 is provided within the handle portion 156, such that when the user depresses the trigger 166, the motor 190 is activated, which then activates the fan 150. The handle portion 156 is positioned laterally generally between the fan 150 and the motor 190. The trigger 166 has a longitudinal and lateral center of gravity at TR. As such, the longitudinal distance of the center of gravity of the trigger TR to the longitudinal center of gravity of battery-powered blower BL is XTR, which is approximately 8.7 mm. The lateral distance from the lateral center of gravity TR to the lateral center of gravity of the battery-powered blower BL is YTR, which is approximately 16.3 mm.

As illustrated, the battery 114 is removably mounted to the housing 110 and more specifically to the third housing 124 and battery mount 108. As shown in FIG. 6C, the battery 114 is provided generally vertically below the handle 156, such that a portion of the battery 114 and the handle 156 are vertically aligned. Accordingly, the vertical center of gravity of the Battery BT is positioned vertically below the handle 156.

In general, the longitudinal and lateral distances between the battery 114 and the motor assembly 160 affects the torque and moment of inertia required to rotate the blower. As two of the heavier components, it is desirable to get these as close to the handle as possible. As shown in FIGS. 1 and 2B, the inner surface area of the battery 114 abuts a side of the housing assembly 110 of the blower. This configuration reduces the distance between the battery 114 and the motor assembly 160 and thus, reduces the moment of inertia. It is contemplated that in this battery 114 to housing 110 configuration, at least approximately 30% of the inner surface of the battery 114 is positioned within the outer perimeter of the housing assembly 110.

In an embodiment illustrated in FIG. 2B, it is contemplated that the blower 100 may be configured such that when the battery 114 is connected to the housing 110, approximately 76% of the inner surface of the battery 114 is positioned within the outer perimeter of the housing assembly 110. Further, the battery 114 and housing assembly 110 may be configured such that approximately 100% of the inner surface of the battery 114 positioned within the outer perimeter of the housing assembly 110.

As shown in FIG. 2B, the longitudinal center of gravity of the battery is represented at BT The longitudinal distance of BT to the longitudinal center of gravity of the blower BL is XBT, which is approximately 117.5 mm. The lateral distance of the side to side center of gravity of the battery BT to the lateral center of gravity of the blower BL is YBT, which is approximately 32.9 mm. Further, the longitudinal distance between the longitudinal center of gravity of the motor MO and the longitudinal center gravity of the battery BT is approximately 126.9 mm. In another embodiment, the distance between the longitudinal center of gravity of the motor MO and the longitudinal center of gravity of the battery is approximately 152.4 mm.

As shown in FIGS. 1 and 7, a battery mount 108 is connected to the third housing portion 124 generally along a top portion of the battery 114, between the motor field case and the battery 114. The battery mount 108 is connected to the third housing portion 124 by fasteners. The battery mount 108 and foot member 116 (including its rear member 184) cooperatively form a chamber or shield which protects the battery 114 in the event that the battery-powered blower 100 is dropped.

As shown in FIG. 9, the tube 112 has a generally curved configuration to facilitate balance and alignment, when the blower 100 is held in an operating position by the user. As shown in FIG. 9, the handle 156 is provided in a generally offset position from the center of the tube 112. Accordingly, the tube 112 is a curved configuration, such that the center of the distal end 119 is aligned with the handle 166, thereby aligning the force output As illustrated in FIGS. 2A, 2B and FIG. 3, the longitudinal center of gravity for the tube 112 about the longitudinal axis (x) is located at TB, in which the longitudinal distance of XTB is approximately 471.9 mm from the longitudinal center of gravity of the blower BL.

Additionally, the lateral center of gravity of the tube 112 is YTB, which his approximately 61.4 mm from the lateral center of gravity of the blower BL. Accordingly, the longitudinal distance between the longitudinal center of gravity of the battery BT and the longitudinal center of gravity of the tube TB is approximately 589.4 mm. Accordingly, the ratio of the longitudinal distance between the longitudinal center of gravity of the battery BT and the longitudinal center of gravity of the blower BL relative to the distance between the longitudinal center of gravity of the tube TB and the longitudinal center of gravity of the blower BL is approximately 0.25 This is a comparison of the distance of the longitudinal center of gravity of the battery BT to the longitudinal center of gravity of the blower BL, to the distance of the longitudinal center of gravity of the tube 1B to the longitudinal center of gravity of the blower BL. This illustrates the compact nature of the battery to the blower, the smaller the ratio, the more compact a unit.

As shown in FIG. 9, the overall longitudinal length of the battery-powered blower is approximately 866.0 mm at a 25 degree working angle and is represented as XBL. As such, the ratio of the distance between the longitudinal center of gravity of the battery BT and the longitudinal center of gravity of the blower BL (117.5 mm), shown in FIG. 2B at XBT, and the overall longitudinal length of the overall battery-powered blower XBL (866.0 mm), shown in FIG. 9 is less than 0.14

FIG. 10 illustrates the connection of the foot member 116 to the battery-powered blower 100. As further shown in FIGS. 11A-C, the foot member 116 is configured to support the battery-powered blower 100 in a resting position. Further, the foot member 116 is configured to protect the battery 114 from impacting a surface, in the event that the battery-powered blower 100 is dropped. As shown, the foot member 116 is a contiguously formed member including a frontal member 180, a first side member 188, second side member 186 and rear member 184. The foot member 116 is adapted for engagement with the lower portion of the second housing portion 122, and a lower portion of the third housing portion 124.

The foot member 116 provides multiple connection points for facilitating a removable connection to the housing assembly 110 of the blower 100. The frontal member 180 has a fastening bracket 172 which extends generally upward from the foot member 116. Generally central to the front portion 180, the fastening bracket 172 has an aperture formed therein for removable connection with the lower portion of the second housing portion 122.

The first side member 188 of the foot member 116, extends between the frontal member 180 and the rear member 184. The rear member 184 extends generally upward from the base of the foot member 116 for removable engagement with the second housing portion 122. As shown, a bracket 174 with an aperture is provided generally centrally along rear member 184. The second side member 186, extends between the front member 180 and rear member 184. The second side member 186 includes a fastening bracket 176 and aperture to facilitate connection with a lower portion of the third housing portion 124. The foot member 116 is removably connected to the housing assembly 110, facilitating replacement, if desired.

The foot member 116 may be constructed of a plastic material such as polypropylene, Xenoy or any other durable composite plastic material. The foot member 116 absorbs energy on impact with a surface, in the event that the battery-powered blower 100 is accidentally dropped. The foot member 116 configured to protect the battery 114 and as such, acts as a dampener, absorbing an impact with a surface. It is contemplated that the composition of the foot member 116 may allow the foot member 116 to absorb up to 71 joules per meter. The foot member 116 further includes a series of ribs 198, provided on the lower surface of the foot member 116, to provide traction when the battery-powered blower 100 is placed on a surface.

As shown in FIGS. 2A, 2B and 3, the foot member 116 has a longitudinal and lateral center of gravity represented at FT, which has the longitudinal distance XFT is 47.1 mm from the longitudinal center of gravity of the blower BL, and has the lateral distance of YFT is approximately 61.4 mm from the lateral center of gravity of the blower BL.

In use, the battery-powered blower's 100 compact configuration permits a user to operate the blower 100 with a reduced moment of inertia in comparison to other blowers. As shown in FIG. 12, the user typically holds the battery-powered blower 100 in front of him/her at the suspension point, which is the handle portion 166. As such, the battery-powered blower 100 is generally in front of the user at an operating angle generally between 0 degrees and −30 degrees, however a typical angle of operation is generally about −25 to −30 degrees, as the user is typically blowing items below him/her.

Figure 13:
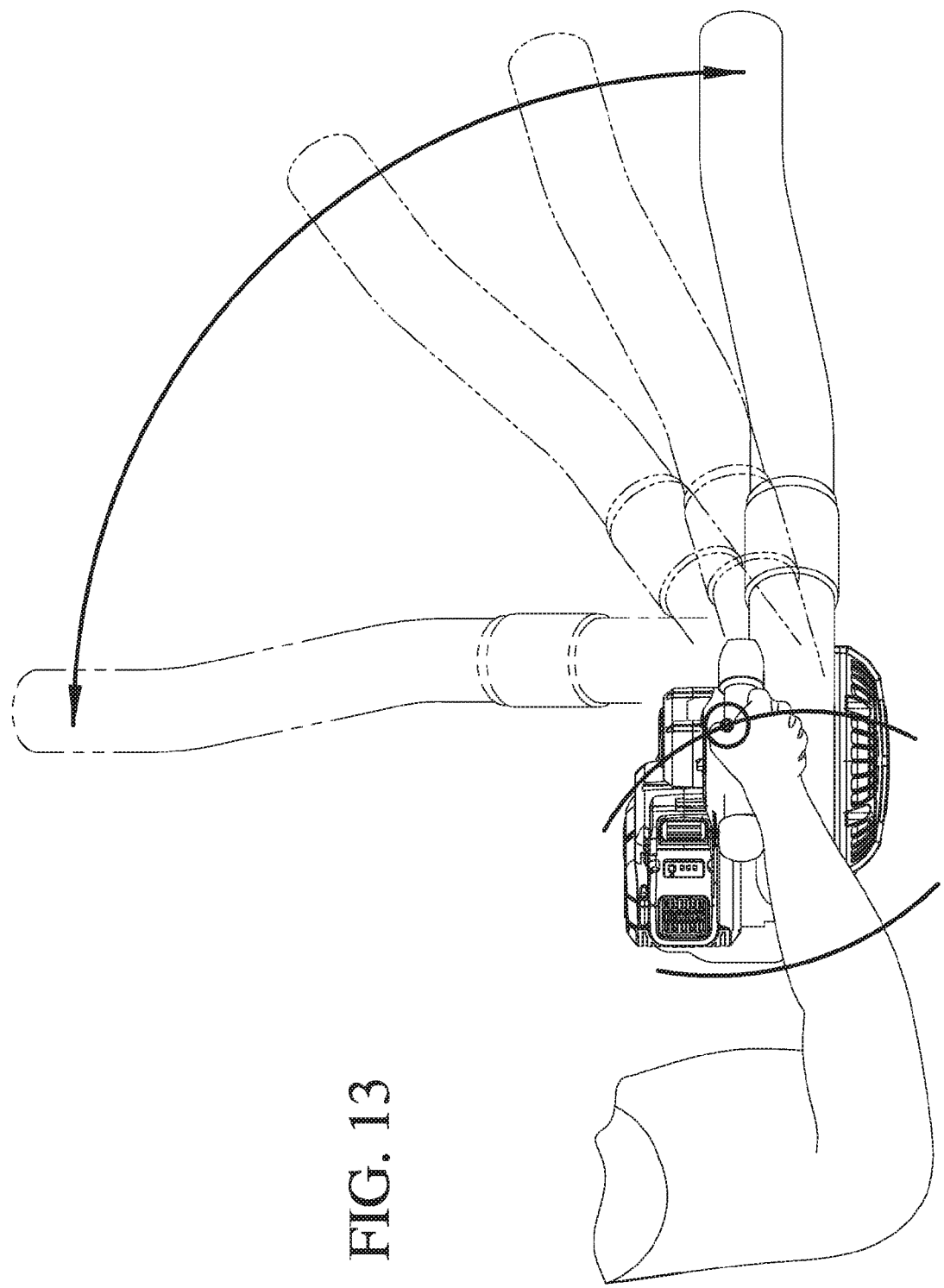
FIG. 13 is an elevational top view of the battery-powered blower operated by a user illustrating rotational operation.

The mechanical advantages of the compact configuration of the battery-powered blower 100 over other previous blowers are remarkable. A user that rotates the battery-powered blower 100 during use, similar to as illustrated in FIG. 13, will appreciate a significant reduction of torque with the compact configuration. It has been calculated that with an rotational speed of 90 deg./sec., and taking 3 seconds to reach that rotational speed, (which equates to 0.524 rad/sec2), 0.051 NM of torque is required and the moment of inertia is approximately 0.09804 (kg*m2). Remarkably, this is approximately 40% less than other blowers, which when measured under the same conditions of angular acceleration of approximately 0.524 (rad/sec2) require 0.073 NM of torque to rotate the blower, and the moment of inertia is approximately 0.13900 (kg*m2). It has further been determined that the ratios referenced herein provide a mechanical advantage in reducing the torque forces and moment of inertia when operating and/or rotating the battery-powered blower 100.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A battery powered blower comprising:
a housing assembly defining an inner chamber for holding a fan, the housing assembly including a handle portion to be gripped by a user;
a motor mounted to a first side of the housing assembly;
the fan having an axis of rotation in a lateral direction of the housing assembly, and located on a second side of the housing assembly, opposite the first side of the housing assembly,
wherein the center-of-gravity of the blower is aligned with the handle portion so as to be substantially underneath the handle portion.

2. The battery powered blower of claim 1, wherein the housing assembly includes a first, second and third housing portion, and wherein the inner chamber for the fan is formed by the first and second housing portion, and the battery is mounted to the third housing portion.

3. The battery powered blower of claim 1, further including a battery mounted substantially on either the first or second side of the housing assembly.

4. The battery powered blower of claim 1, further comprising a foot assembly removably secured to the bottom of the housing assembly so that only the foot assembly contacts a resting surface, the foot assembly having portions that are contoured to the shape of the battery to protect the battery against drops.

5. The battery powered blower of claim 1, wherein the housing assembly includes a sleeve defining an air outlet for connecting to an outlet tube, the sleeve having a longitudinal axis, the handle having a longitudinal axis, and wherein the longitudinal axis of the sleeve lies in a different plane as the longitudinal axis of the handle.

6. A battery powered blower, comprising:
a housing assembly having a volute for holding a fan;
a handle portion attached to the housing assembly, the handle portion having a central longitudinal axis;
a motor disposed on one side of the handle portion;
a fan disposed on another side of the handle portion, and operatively connected to the motor; and
a battery attached to the housing assembly, wherein a majority of the battery lies within an outer perimeter defined by the volute.

7. The battery powered blower of claim 6, further comprising a motor field case to enclose the motor.

8. The battery powered blower of claim 7, further comprising a pulley system mounted to an exterior of the motor field case.

9. The battery powered blower of claim 8, wherein the pulley system includes a generally circular, first gear and a generally circular second gear operatively connected, by a belt.

10. The battery powered blower of claim 6, further comprising a pulley system to engage the motor and the fan.

11. The battery powered blower of claim 6, wherein the battery is located to a side of the handle portion.

12. The battery powered blower of claim 6, wherein the battery is positioned to the rear of the motor.

13. A battery powered blower, comprising:
a housing portion having a volute shaped interior surface and a sleeve defining an air outlet;
a tube having a proximal end, the proximal end received in the sleeve, the tube having a distal end, the distal end of the tube having a longitudinal axis that is laterally offset from the longitudinal axis of the sleeve;
a fan disposed on one side of the longitudinal axis of the sleeve to force air out of the tube; a motor and a battery disposed on a second side of the longitudinal axis of the sleeve; and
a handle portion provided at an upper portion of the housing portion, wherein the handle portion is provided in an offset position from a longitudinal axis of the sleeve.

14. The battery powered blower of claim 13, further comprising a belt drive system and wherein the motor is operative connected to fan via the belt drive system.

15. The battery powered blower of claim 13, further comprising a foot assembly to support the battery powered blower in a resting position wherein in the resting position the handle portion is in a top most position of the battery powered blower.

16. The battery powered blower of claim 13, wherein the center of gravity of the battery powered blower lies laterally beneath the handle.

17. The battery powered blower of claim 13, further comprising a foot member and a battery mount cooperatively forming a chamber to protect the battery if the battery powered blower is dropped.

\* \* \* \* \*